United States Patent

[11] 3,628,872

[72] Inventor  Victor Eduardo Vasquez Miranda
       Huntington Beach, Calif.
[21] Appl. No. 874,557
[22] Filed     Nov. 6, 1969
[45] Patented  Dec. 21, 1971
[73] Assignee  Baxter Laboratories, Inc.
       Morton Grove, Ill.
       The portion of the term of the patent
       subsequent to July 20, 1988, has been
       disclaimed.

[54] SPECTROPHOTOMETRIC TEST APPARATUS AND METHOD EMPLOYING RETROFLECTIVE MEANS
     8 Claims, 5 Drawing Figs.
[52] U.S. Cl. .................................................. 356/201,
                                                    250/218
[51] Int. Cl. ........................................... G01n 21/06
[50] Field of Search ........................................... 250/218,
       43.5 R; 356/201, 173, 180, 181, 183, 196, 197,
                          209, 239, 244; 350/104, 105

[56]          References Cited
         UNITED STATES PATENTS
2,451,501  10/1948  Liben ........................... 356/209
2,562,181   7/1951  Frommer ........................ 250/218
2,649,011   8/1953  Black .......................... 356/246
2,964,640  12/1960  Wippler ........................ 356/208

Primary Examiner—James W. Lawrence
Assistant Examiner—D. C. Nelms
Attorneys—Robert G. Pollock and Walter C. Kehm ABSTRACT: An improved method and apparatus are provided by which a selected radiation is passed through a test body and is subsequently measured, so as to determine the amount of the radiation absorbed by the body, and which involves the redirection of the radiation by retroreflective means through the test body directly back along its original path, prior to its detection by an appropriate radiation detector. In this way refraction effects due to flaws in the test body, which normally would direct random portions of the radiation away from the detector are cancelled, and the entire radiant beam is incident on the radiation detector despite such flaws.

INVENTOR:
Eduardo Miranda

By Walter C. Kehm
ATTORNEY

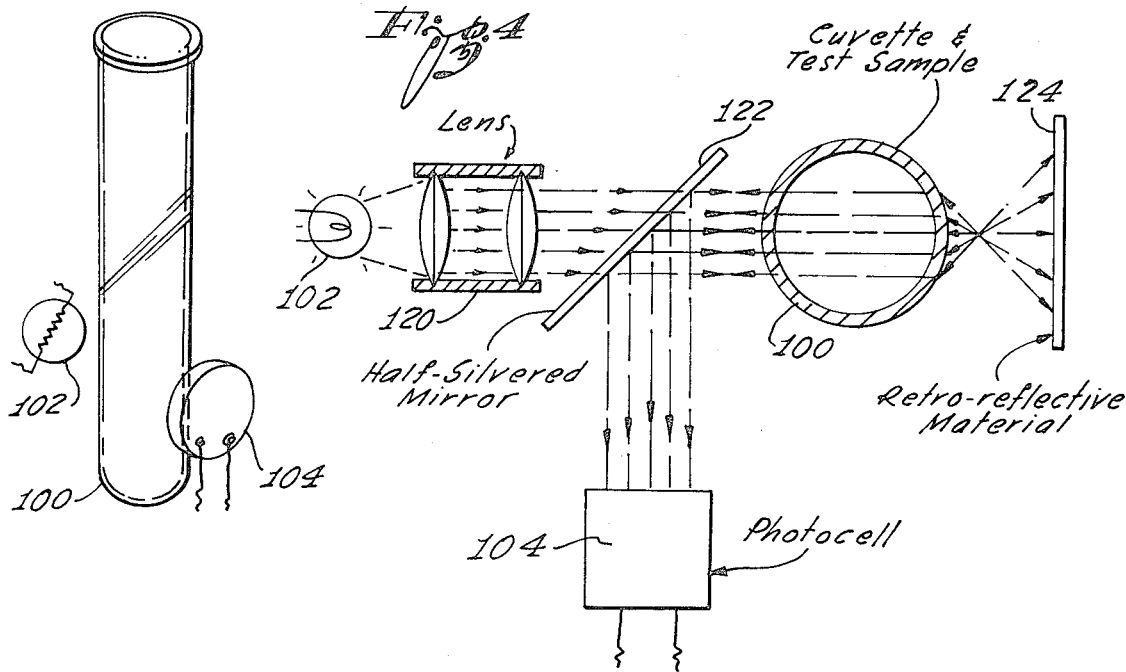
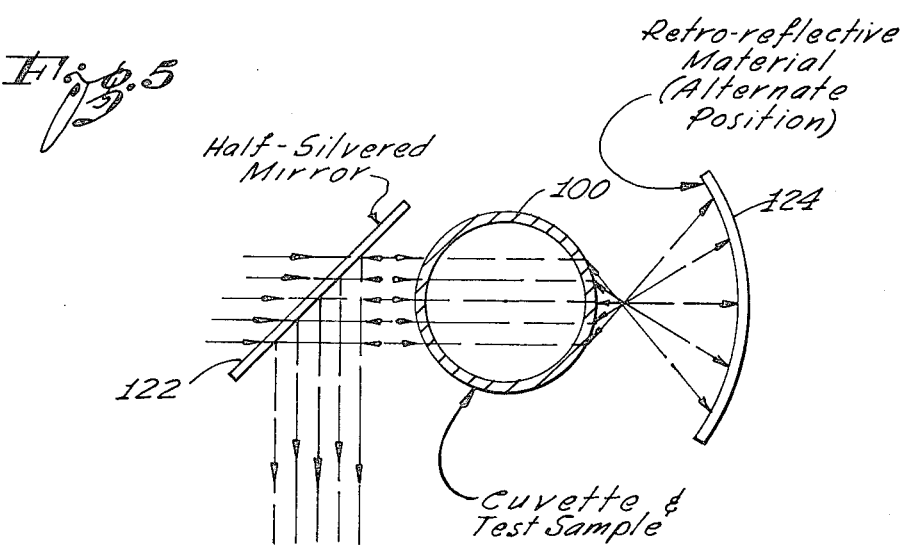

SPECTROPHOTOMETRIC TEST APPARATUS AND METHOD EMPLOYING RETROFLECTIVE MEANS

BACKGROUND OF THE INVENTION

As is well known, a wide variety of measuring instruments include the concept of passing a beam of appropriate radiation, such as light or other type of radiant energy through a test body at, for example, selected wavelengths, so that the absorption effects of the test body on the various wavelengths may be measured. The measurement is usually achieved by causing the radiation, after it has passed through the test body, to be incident on an appropriate radiation detector. The radiation detector converts the incident radiation into a corresponding electrical signal, for example, and the amplitude of the electrical signal is measured, so as to determine the amount of energy passing through the test body which, in turn, provides a measure of the absorption characteristics of the test body.

However, measurement errors occur in the usual prior art type of instrument, unless utmost care is taken, and expensive and high-quality test equipment is used. Even then, there is a tendency for measurement errors to occur, since it is virtually impossible to provide for all the radiation passing through the test body to be incident on the radiation detector, without portions of the radiation becoming refracted due to flaws in the body, or to be otherwise directed away from the radiation detector. Since the flaws are of a random nature for various test bodies, there is no constant error, and randomly varying reading errors occur in the prior art measurement systems and apparatus.

In practicing the concepts of the present invention, all the radiant energy passing through the test body is returned back by retroreflective means through the body and along its original path, so that the refraction effects are cancelled out. Then, the radiant energy emerging from the front face of the body is directed to the radiation detector. In this way, there is no need for painstakingly constructed and expensive flawless equipment. Instead, relatively inexpensive components may be utilized, without the production of concomitant measuring errors in the system in which the concept of the invention is used.

The term "retroreflective" or "reflex reflective" as used herein is intended to designate a reflective surface which is capable of reflecting an incident beam or ray of light, in such a manner that the beam or ray is redirected back towards its source even though the incident light strikes the reflecting surface at an angle. The aforesaid terms are intended to distinguish the type of reflection with which the present invention is concerned from the specular reflection of a usual mirror, and from the light dissipation effect of a light-diffusing surface.

Retroreflective reflectors are known and have been used as highway marking and advertising signs. They are well suited for that purpose since they act to reflect the headlights of passing vehicles directly back to the vehicles with a high degree of brilliance.

Retroreflective members are usually made up of a multiplicity of glass beads which are adhesively secured to a reflective substrate or layer of reflective material. The individual beads then serve as spherical lenses, so that any beam or ray of light which is directed from any angle onto the retroreflective member is refracted to the reflective layer by the individual beads and then reflected and again refracted directly back towards its origin.

Briefly stated, therefore, a reflex or retroreflective member is one which acts on an incident beam or ray of light to refract and reflect it in such a manner that most of the light is returned back towards its source essentially along the same path.

The retroreflective or reflex member which is appropriate for reflecting the light rays directly back along their paths of incidence, regardless of the angles of incidence, may be of the type which is presently being marketed, for example, by the 3M Company, under its trademark "Scotchlite," and identified by the company as its "Scotchlite Reflective Sheeting No. 7610."

One embodiment of the improved apparatus to be described, and which embodies the concept and method of the invention, uses a retroreflective member by which the light passing through a liquid sample in a transparent vessel is reflected back through the vessel and through the sample and is then directed to the photocell. By such an expedient, measurement errors which would otherwise be produced due to optical imperfections in the transparent wall of the vessel are compensated and cancelled out. In the apparatus, inexpensive transparent vessels may be used for containing the liquid sample to be tested, since there is no particular need for the transparent walls of the vessels to be free of optical imperfections.

Spectrophotometric analysis is a method of chemical analysis based upon the absorption by a particular substance in a liquid test sample of light of a particular wavelength. A simple photometric system for spectrophotometric analysis comprises a light source, a means for directing a limited band of selected wavelengths from the light source through the liquid test sample, and a photocell for detecting the amount of light transmitted through the test sample at the selected wavelengths and for converting the same into analog electrical signals.

The apparatus of the invention is particularly suited for the aforesaid spectrophotometric analysis, and for other tests which include directing light through a fluid sample and detecting the light passed through the test sample by means of a suitable photocell. As mentioned above, it is usual in apparatus of the type under consideration to contain the fluid sample undergoing the test in a vessel having a transparent wall, and directing light from a light source through the transparent wall of the vessel and through the fluid contained therein. The amount of light passed through the fluid is then detected by the appropriate photocell as mentioned above. However as pointed out previously herein, optical deficiencies in the transparency of the wall of the vessel tend to create measurement errors in the prior art systems and apparatus. This is because the optical imperfections in the transparent wall serve to introduce spurious refractions into the light passed therethrough.

Attempts in the prior art to minimize the aforesaid errors have normally been directed to efforts to improve the optical characteristics of the transparent vessels in which the test samples are contained. However, as pointed out above, this necessitates the use of extremely expensive transparent vessels, and even the expensive vessels still exhibit optical imperfections giving rise to measurement errors. One specific object of the invention is to provide an improved and simple instrument, which is accurate and precise in its photometric measurements, and which does not require particularly high optical capabilities in the walls of the transparent vessels in which the test samples are placed, so that relatively inexpensive vessels may be used without affecting the accuracy of the instrument.

When the concepts of the present invention are utilized, extremely precise photometric and other measurements may be made, even with relatively inexpensive equipment which does not even exhibit any high degree of optical perfection. The system and apparatus of the invention is constructed so that when the test body is a liquid, and when the vessel containing the test liquid is rotated or otherwise changed in position, no significant change occurs in the photometric measurements made by the system. Moreover, in such a case, a series of different transparent vessels may be used for a series of tests without introducing any variety of errors into the test readings due to different optical characteristics of the various vessels.

BRIEF DESCRIPTION OF THE DRAWINGS

FIG. 3 is a schematic representation of prior art photometric apparatus, in which light from a light source is passed to a photocell through a liquid test sample contained in a test tube;

FIG. 4 is a schematic representation showing one apparatus embodiment of the present invention, in which a retroreflective member is used to reflect the light rays directly back through the fluid sample along the same light paths for compensation purposes, before detection by the radiation sensitive device; and FIG. 5 is a fragmentary schematic representation, like FIG. 4, and showing a slight modification in the apparatus.

DETAILED DESCRIPTION OF THE ILLUSTRATED EMBODIMENTS

Figure 1:
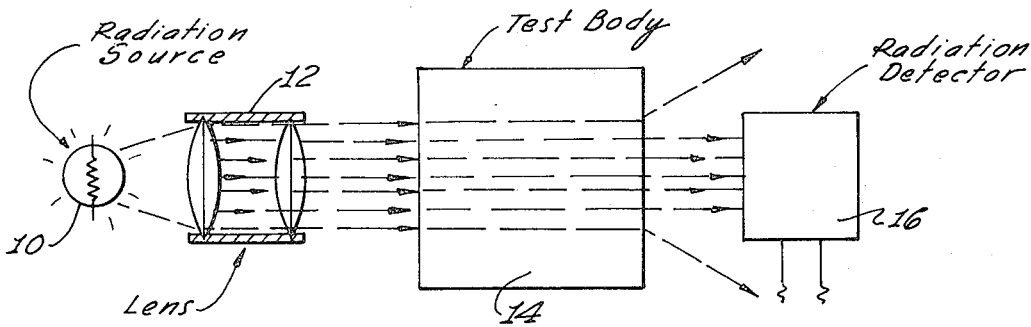
FIG. 1 is a schematic representation of a typical prior art measuring system in which a beam of radiation from a particular source is passed through a test body to a radiation detector, so that the absorption characteristics of the test body on the radiant beam may be measured.

As shown in FIG. 1, for example, a radiation source which, in a particular example, for example, may be a light source, is designated 10. Radiation from the source 10 may be formed into a beam by any appropriate lens 12. The resulting beam is passed through the test body, designated as 14 and to a radiation detector 16. The radiation detector 16, as mentioned above, serves to convert the radiations from the source 10 into electrical signals, the electrical signals being used to designate the absorption characteristics of the test body on the radiation. Imperfections in the test body itself, or in the container in which it is held, may cause some of the rays of radiation in the beam to be refracted or reflected, and thereby deflected away from the surface of the radiation detector 16 or to different parts of its surface, so that measurement errors may arise.

Figure 2:
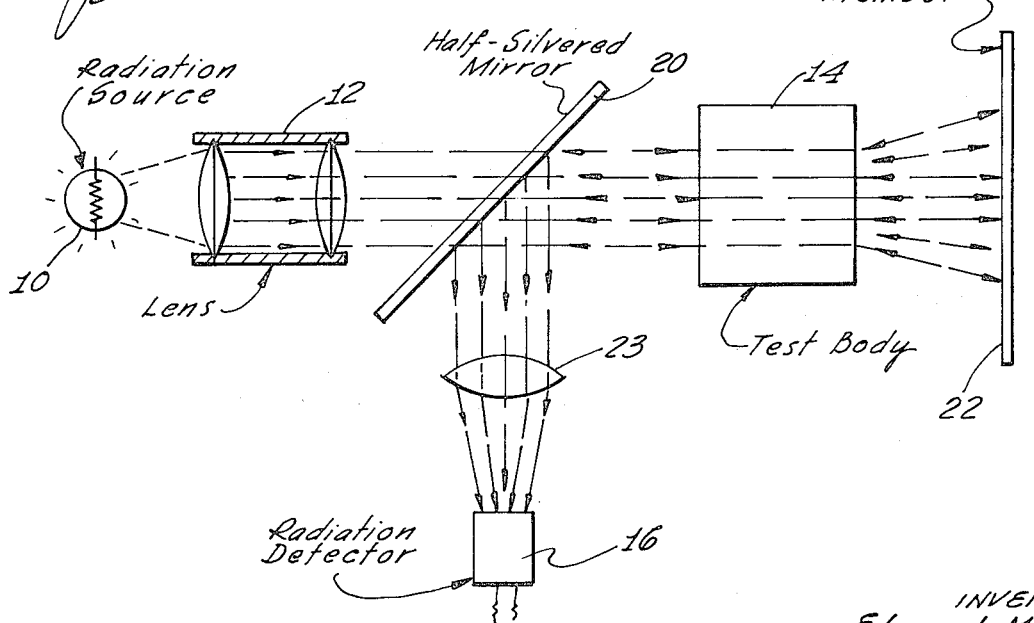
FIG. 2 shows the system of FIG. 1 modified to incorporate the teachings of the present invention.

In the system of the present invention shown in the embodiment of FIG. 2, the beam of radiation from the lens 12 is first passed through a partially reflective member 20 and then through the test body 14. The radiation beam is then directed directly back along its same path by means, for example, of a retroreflective member 22 of the type described in some detail previously herein.

The partially reflecting member 20 may be of any known type which, for example, is capable of passing radiations through it in one direction, such as from the left to the right in FIG. 2, but reflecting radiations directed to it from the other direction, such as from the right to the left in FIG. 2. The reflected radiations from the member 20 are directed to the radiation detector 16, for example, through a condensing lens 23 which permits the use of relatively small and inexpensive detectors.

It will be appreciated that although the radiations passing through the test body 14 may be deflected due to flaws or other imperfections in the test body, the retroreflective member 22 serves to redirect each ray of radiation back along its original path, so that it emerges from the front side of the test body in the original beam, as shown in FIG. 2. By this simple expedient, all the radiations passing through the test body reach the radiation detector 16. Also, and as mentioned above, increased sensitivity is achieved over the usual prior art systems, due to the fact that the beam of radiation passes twice through the test body 14 prior to its detection by the radiation detector 16.

In carrying out the usual prior art photometric analysis, and as shown in FIG. 3, a transparent vessel, such as a test tube 100, which contains the sample to be tested, is placed between a light source 102 and a photocell 104. The light from the light source passes through the transparent wall of the vessel 100, and through the test sample in the vessel, to be detected by the photocell. Such apparatus, and photometric analysis, in general are well known to the art.

As is well known during photometric measurements, it is usual to move the vessel 100 up and down, or to rotate the vessel, during any particular test, and it is also usual to employ a series of similar vessels 100 for conducting a series of tests. It is evident that any optical imperfections in the wall of the vessel 100 produce refractions in the light passing through the fluid sample so that the light does not fall with full intensity on the photocell 104. Therefore, spurious changes in the output of the photocell occur when the vessel 100 is moved in any way with respect to the light from the source 102, or when it is replaced by other similar vessels.

An important object of the present invention, as mentioned above, is to provide a simple and expedient system and apparatus whereby the focusing action due to the refraction of the test tube 100, and of the optical imperfections in the wall of the test tube are cancelled. In carrying out the concepts of the invention, and as shown in FIG. 4, light from the light source 102 is directed by means, for example, of a lens 120 through a partially reflective member 122 and through the transparent vessel 100 and test sample contained therein onto a retroreflective member 124.

The partially reflective member 122 may be any known type of half-silvered mirror, or its equivalent, which has the capability of passing light from the source 112 and lens 120 through it, as shown schematically in FIG. 4, and of reflecting light directed back to it through the vessel 100. The light reflected by the member 122 is directed onto the photocell 104, as shown schematically in FIG. 4.

As mentioned above, the retroreflective member 124 may be a retroreflective sheeting of the type marketed by the 3M Company. As also mentioned, the member 124 may be a "Scotchlite" brand high-gain reflective sheeting No. 7010. The sheeting comprises an exposed lens, high-gain, retroreflective plastic film which may be precoated with a pressure-sensitive adhesive so as to be attached to an appropriate supporting surface. Under ambient light, the film is a neutral gray color. HOwever, the film is actually made up of a multiplicity of optical elements, each of which reflects any light ray incident on it directly back along the path of incidence of the ray, and regardless of the angle of incidence of the ray with respect to the plane of the reflective member.

Therefore, in the system and apparatus shown schematically in FIG. 4, the light rays passing through the test vessel 100 and through the liquid test sample contained therein are directed onto the retroreflective member 124, and the light rays are reflected by the member 124 directly back along their paths of incidence, so as to be reflected by the member 122 onto the photocell 104.

Therefore, any light rays which are refracted as they pass through the vessel 100 due to its optical imperfections, and directed away from the path of the light beam, are still detected by the photocell in the system of the invention, since such refracted light rays are reflected back to the vessel 100 and returned along their original path to the reflecting member 122. Also, the reflected light beams have a doubled reduced light intensity, due to their forward and return travel through the test sample, and more sensitivity is provided than in the prior art systems, due to the fact that each light beam passes twice through the fluid sample.

The retroreflective member 124 may have a planar configuration such as shown in FIG. 4, or it may be curved as shown in FIG. 5 so as to gather all the light rays passing through the test sample and through the container 100, and to reflect the light rays back along their original paths for direction by the member 122 to the photocell 104.

It will be appreciated, therefore, that all the light directed through the fluid sample is reflected by the retroreflective member 124 back through the sample and onto the photocell 104, so that none of the light rays is lost. In the usual prior art system, as shown in FIG. 3, for example, many of the light rays passing through the fluid sample and through the transparent wall of the test tube 100 are refracted away from the sensitive surface of the photocell, so that errors are produced in the photocell readings due to optical imperfections in the test tube.

What is claimed is:

1. Test apparatus including: a test body; a radiation source positioned to direct radiations through said test body; retroreflective means positioned on the opposite side of said test body for redirecting the radiations passing therethrough directly back through said test body; a radiation-detecting means for converting the radiations from said test body into a corresponding signal; and means positioned adjacent said test body for directing the radiations redirected therethrough onto said radiation-detecting means.

2. The apparatus defined in claim 1, in which said directing means is positioned between said radiation source and said test body, said directing means comprises a partially reflecting member capable of passing radiations from said source to said test body and of reflecting radiations redirected through said test body onto said radiation-detecting means.

3. A method of testing the absorption characteristics of a test body on a selected radiation which comprises: directing a beam of the selected radiation through said test body; redirecting the beam of radiation back through said test body along its original path by retroreflective means; and directing the redirected beam of radiation from said test body to a radiation-detecting means.

4. Photometric apparatus including: a transparent vessel for containing a fluid test sample; a radiation source positioned to direct radiations through said vessel and through the test sample contained therein; a retroreflective member positioned on the opposite side of said vessel from said radiation source for reflecting the radiations back through said vessel and through the test sample contained therein; a radiation-sensing device; and means positioned adjacent said vessel for directing the radiations reflected through said vessel and through the test sample contained therein onto said radiation-sensing device.

5. The apparatus defined in claim 4, in which said radiation source is a light source.

6. The apparatus defined in claim 4, in which said radiation source is a light source, and in which said radiation-sensing device is a photocell.

7. The apparatus defined in claim 4, in which said directing means is positioned between said source and said vessel and comprises a partially reflective member capable of passing radiations from said source to said vessel and of further reflecting the reflected radiations from said vessel onto said radiation-sensing device.

8. The apparatus defined in claim 4, in which said reflective member is composed of retroreflective material capable of reflecting rays incident thereon directly back along the paths of incidence thereof.

* * * * *